Patented Jan. 28, 1936

2,028,792

UNITED STATES PATENT OFFICE 2,028,792

PREPARATION OF ALKOXY FATTY ACID ESTERS OF CELLULOSE

Carl J. Malm, Rochester, N. Y., and James D. Coleman, Columbus, Ohio, assignors to Eastman Kodak Company, Rochester, N. Y., a corporation of New York No Drawing. Application February 29, 1932, Serial No. 595,958

16 Claims. (Cl. 260—101)

The present invention relates to the preparation of cellulose esters containing alkoxy-fatty acid groups by reacting upon an esterifiable cellulosic material with an alkoxy-fatty acid anhydrid in the presence of a basic catalyst such as pyridine.

Heretofore in the esterification of cellulosic materials in which alkoxy-fatty acid compounds have been present, such for example as disclosed in U. S. Patent No. 1,880,808, which issued October 4, 1932, a non-basic catalyst has been employed and in that case the alkoxy-fatty acid compounds present were merely regarded as either impellers or solvents in the reaction mixture as it was found that they did not contribute any alkoxy-fatty acid groups to the cellulose.

We have taken note of the British Patents 314,918 and 314,919 in which it was attempted to prepare alkoxy-fatty acid compounds of cellulose by treating the cellulose with alkoxy-fatty acid compounds in the presence of a non-basic catalyst but as has been previously recognized in U. S. Patent No. 1,880,808, which issued October 4, 1932, the alkoxy-fatty acid compounds do not contribute any groups to the cellulose in the presence of a non-basic catalyst. We have verified the accuracy of that disclosure of the Clarke & Malm application by attempting to alkoxyacylate cellulose according to the disclosure of the British Patents 314,918 and 314,919 and analyzing the resulting product formed, however, such analysis showed that alkoxy-fatty acid groups were substantially absent from the well washed product prepared according to the process disclosed by those British patents. Up until the time of our invention, no one, to our knowledge, had ever prepared an alkoxy-fatty acid ester of cellulose.

One object of our invention is to provide a process of preparing cellulose esters containing alkoxy-fatty acid groups. Another object of our invention is to provide a process of preparing cellulose esters containing alkoxy-fatty acid groups directly by means of an alkoxy-fatty acid anhydrid which in our process itself contributes groups to the cellulose. Other objects will appear herein.

We have found that contrary to the opinion of those skilled in the art prior to our invention cellulose esters may be prepared which contain alkoxy-fatty acid groups. We have found that esterifiable cellulosic material may be alkoxy acylated by means of an alkoxy-fatty acid anhydrid in the presence of a basic catalyst. We have found that cellulose esters may be prepared by our process which possess desirable solubilities without the necessity of a subsequent hydrolysis such as is usually necessary in the case of, for instance, cellulose acetate. We have found that cellulose esters containing alkoxy-fatty acid groups may be prepared from either an esterifiable cellulose or cellulose derivative, such as an ester or an ether, all of which will be referred to herein as cellulosic material. We have found that by means of basic catalysts alkoxy-fatty acid esters of cellulose are obtained which exhibit a minimum of degradation of the cellulosic material.

Our process broadly comprises the esterification of an esterifiable cellulosic material with an alkoxy-fatty acid anhydrid in the presence of a basic catalyst until a dope or solution is obtained. The following examples illustrate the preparation of cellulose esters containing alkoxy-fatty acid groups in accordance with our invention. These examples are to be regarded as illustrative and in no way limiting of our invention:

Example I

To about 5 lbs. of cellulose such as refined cotton linters was added a mixture of about 20 lbs. of methoxyacetic anhydrid, 20 lbs. methoxyacetic acid and 5 lbs. of pyridine. This mass was maintained at a temperature of 60° C. for 72 hours when a homogenous solution or dope results. The cellulose ester formed was precipitated by pouring into water and was then washed with hot water and dried. The resulting cellulose ester was found to be a cellulose methoxy acetate and was soluble in ethyl-methyl ketone, methyl acetate and pyridine.

Example II

To about 5 lbs. of cellulose acetate having a 38% acetyl content was added a mixture of approximately 10 lbs. of ethoxy acetic anhydrid and 20 lbs. of pyridine. The resulting mass was maintained at a temperature of 50–60° C. for 6 days. The ester formed, which was cellulose acetate-ethoxyacetate, was precipitated and washed with water as was done in the previous example. This ester was found to be soluble in ethylene chloride, acetone and ethyl-methyl ketone.

Example III

To about 5 lbs. of cotton was added a mixture of approximately 20 lbs. of ethoxy acetic anhydrid and 40 lbs. of pyridine. The mass was then maintained at a temperature of 50° C. for 34 days. At the end of this time a solution or dope was obtained from which the ester formed was separated in the customary manner. The resulting ester was found to be a cellulose ethoxyacetate. It was soluble in ethyl-methyl ketone, methyl chloracetate, pyridine and methylacetate but was insoluble in acetone.

The esters resulting from processes such as the above, carried out according to our invention when coated out from solution in a volatile solvent will give a flexible sheet or skin which may be employed for photographic films, wrapping material or for any other purpose for which cellulose derivative sheeting is employed at present. They may also be employed in making lacquers, artificial silk, etc. It is usually preferred that a plasticizer such as triphenyl or tricresyl phosphate be added to the esters prepared according to our invention, when employing them for the manufacture of cellulose derivative products. Various other plastic materials such as cellulose nitrate, cellulose acetate, cellulose mixed esters such as the acetate-propionate resins, gums or waxes may where compatible, be incorporated with the alkoxy-fatty acid esters of cellulose produced according to our invention if desired.

Obviously various modifications of a technical nature may be made of our invention without departing from the scope thereof. For example instead of pyridine various other tertiary organic bases may be employed as the catalyst in the carrying out of our invention. In addition to pyridine, other tertiary organic bases which we have found particularly useful are alpha-picoline and quinoline. Other organic bases such as di-alkyl anilines, hexahydro-dialkyl anilines, dimethyl n-hexylamine, isoamyldiethylamine etc. altho untried, would at once suggest themselves to those skilled in the art as a group which would supply organic bases suitable for employment as the catalyst in the present invention.

Although the ethoxy and methoxy acetic anhydrides are the preferred anhydrides to be employed in our invention, as they are well-known, and more economical and effective than similar compounds, nevertheless other alkoxy-fatty acid anhydrides may be employed whether a higher alkoxy group is combined with an acetic group such as in propoxy- or butoxy-acetic anhydrides, a lower alkoxy group is combined with a higher acid group such as in methoxy- or ethoxy-propionic anhydrid or both the alkoxy and the acid group be higher in the number of carbon atoms than acetic such as a propoxy-propionic anhydrid. It will be found, however, that, as is usually the case, the higher alkoxy-fatty acid anhydrides are less effective in the esterification process of our invention than those having a lower number of carbon atoms. If desired a mixture of a plurality of alkoxy-fatty acid anhydrides may be employed in the esterification bath instead of the single anhydrid thus forming an ester of cellulose having more than one alkoxy-fatty acid group attached thereto.

Any of the esterifiable cellulose materials whether cellulose itself or a derivative of cellulose may be employed as the starting material in the carrying out of our process. For example, if cellulose is desired as the starting material cotton linters, sulfite wood pulp, regenerated cellulose or the like may be employed in our process or if a cellulose derivative is desired, an incompletely esterified cellulose which admits of further esterification is desirable such as a cellulose acetate or a cellulose propionate which has been fully esterified and which has then been submitted to a partial hydrolysis to reduce the acyl content of the ester. Obviously, cellulose nitrates having a low nitrogen content or cellulose ethers which admit of esterification of their remaining hydroxy groups may also be employed.

The method of separating an ester prepared according to our invention from its reaction mixture after the completion of the esterification is a matter of individual taste. Altho in the examples we have disclosed the separation of the esters by precipitating them into water which is a simple and inexpensive method, various other precipitants may be employed to produce a product having a different physical appearance than that of a product precipitated by water. If desired however instead of precipitating the ester from its reaction mixture, that mixture may be spray dried to separate the ester from its solvents.

Various other modifications of our invention are apparent to those skilled in the art and also come within the scope of our invention.

What we claim is:

1. The process of making cellulose derivatives containing an alkoxy-fatty acid group which comprises treating a cellulosic material having free and available hydroxyl groups with an esterifying bath substantially comprising an alkoxy-fatty acid anhydrid and a tertiary organic base as the catalyst.

2. The process of making cellulose derivatives containing an alkoxy-fatty acid group which comprises treating a cellulosic material having free and available hydroxyl groups with an esterifying bath substantially comprising an alkoxy-fatty acid anhydrid and pyridine.

3. The process of making cellulose derivatives containing an alkoxy-fatty acid group which comprises treating cellulose with an esterifying bath substantially comprising an alkoxy-fatty acid anhydrid and a tertiary organic base as the catalyst.

4. The process of making cellulose derivatives containing an alkoxy-fatty acid group which comprises treating cellulose with an esterifying bath substantially comprising an alkoxy-fatty acid anhydrid and pyridine.

5. The process of making cellulose derivatives containing an alkoxy-fatty acid group which comprises treating a cellulose derivative having free and available hydroxyl groups with an esterifying bath substantially comprising an alkoxy-fatty acid anhydrid and a tertiary organic base as the catalyst.

6. The process of making cellulose derivatives containing an alkoxy-fatty acid group which comprises treating a cellulose derivative having free and available hydroxyl groups with an esterifying bath substantially comprising an alkoxy-fatty acid anhydrid and pyridine.

7. The process of making cellulose derivatives containing an alkoxy acetic acid group which comprises treating a cellulosic material having free and available hydroxyl groups with an esterifying bath substantially comprising an alkoxy acetic acid anhydrid and a tertiary organic base as the catalyst.

8. The process of making cellulose derivatives containing an alkoxy acetic acid group which comprises treating a cellulosic material having free and available hydroxyl groups with an esterifying bath substantially comprising an alkoxy acetic acid anhydrid and a basic organic catalyst selected from the group consisting of pyridine, alpha-picoline and quinoline.

9. The process of making cellulose derivatives containing an alkoxy acetic acid group which comprises treating a cellulosic material having free and available hydroxyl groups with an esterifying bath substantially comprising an alkoxy acetic acid anhydrid and pyridine.

10. The process of making cellulose derivatives containing an ethoxy fatty acid group which comprises treating a cellulosic material having free and available hydroxyl groups with an esterifying bath substantially comprising an ethoxy fatty acid anhydrid and a tertiary organic base.

11. The process of making cellulose derivatives containing an ethoxy acetic acid group which comprises treating a cellulosic material having free and available hydroxyl groups with an esterifying bath substantially comprising an ethoxy acetic acid anhydrid and a tertiary organic base.

12. The process of making cellulose derivatives containing an ethoxy acetic acid group which comprises treating a cellulosic material having free and available hydroxyl groups with an esterifying bath substantially comprising an ethoxy acetic acid anhydrid and a basic organic catalyst selected from the group consisting of pyridine, alpha-picoline and quinoline.

13. The process of making cellulose derivatives containing an ethoxy fatty acid group which comprises treating a cellulosic material having free and available hydroxyl groups with an esterifying bath substantially comprising ethoxy fatty acid anhydrid and a tertiary organic base as the catalyst.

14. The process of making cellulose derivatives containing an ethoxy acetic acid group which comprises treating cellulose with an esterifying bath substantially comprising ethoxy acetic acid anhydrid and pyridine.

15. The process of making cellulose derivatives containing an ethoxy acetic acid group which comprises treating cellulose with an esterifying bath substantially comprising ethoxy acetic acid anhydrid, methoxy acetic acid and pyridine.

16. The process of making a cellulose acetate-ethoxy acetate which comprises treating a cellulose acetate having free and available hydroxyl groups with an esterifying bath substantially comprising ethoxy acetic anhydride and pyridine.

CARL J. MALM.
JAMES D. COLEMAN.